United States Patent [19]

Klein

[11] 4,422,294
[45] Dec. 27, 1983

[54] HYDRAULIC ACTUATING AND LOCKING DEVICE

[75] Inventor: Heinz H. Klein, Rossbach, Fed. Rep. of Germany

[73] Assignee: Dr. Boy GmbH, Fernthal, Fed. Rep. of Germany

[21] Appl. No.: 254,594

[22] Filed: Apr. 16, 1981

Related U.S. Application Data

[63] Continuation of Ser. No. 64,747, Aug. 8, 1979, abandoned.

[30] Foreign Application Priority Data

Aug. 9, 1978 [DE] Fed. Rep. of Germany ....... 2834895

[51] Int. Cl.³ .............................................. B60T 17/00
[52] U.S. Cl. ........................................ 60/565; 60/568;
  60/588; 60/593; 92/8; 92/193
[58] Field of Search .................. 60/560, 586, 587, 593,
  60/565, 588, 589, 574, 575, 563, 585, 592, 568,
  569; 91/519; 92/108, 109, 113, 193, 8

[56] References Cited

U.S. PATENT DOCUMENTS

| | | | |
|---|---|---|---|
| 1,930,155 | 10/1933 | Wiedmann | 60/560 |
| 2,501,108 | 3/1950 | Wahlberg | 60/587 |
| 3,266,415 | 8/1966 | Palmer | 60/593 |
| 3,426,530 | 2/1969 | Georgelin | 60/560 |
| 3,669,576 | 6/1972 | Little | 92/193 |
| 3,786,725 | 1/1974 | Aoki | 91/519 |
| 3,839,996 | 10/1974 | De Biasse | 92/193 |

FOREIGN PATENT DOCUMENTS

| | | |
|---|---|---|
| 683046 | 10/1939 | Fed. Rep. of Germany . |
| 1130154 | 5/1962 | Fed. Rep. of Germany . |
| 1805938 | 7/1973 | Fed. Rep. of Germany . |
| 991742 | 5/1944 | France ................. 60/593 |

OTHER PUBLICATIONS

Hofheinz Catalog pp. 1–10.

Primary Examiner—Abraham Hershkovitz
Attorney, Agent, or Firm—Pennie & Edmonds

[57] ABSTRACT

A hydraulic actuating and locking device includes a locking piston within a cylinder, an actuating piston within a cylinder in the rear surface of the locking piston and a pressure multiplier connected to the space behind the piston. A passage, constituting a high pressure cylinder, connects the space behind the piston to an oil reservoir and is adapted to receive and be sealed by the high pressure piston of the pressure multiplier.

6 Claims, 2 Drawing Figures

HYDRAULIC ACTUATING AND LOCKING DEVICE

This is a continuation of application Ser. No. 064,747, filed Aug. 8, 1979, now abandoned.

The present invention relates to hydraulic actuating and locking devices of the type intended to move a movable member to a position in which the member is restrained, and then to lock it in that position. Such devices find particular, though not exclusive, application in conjunction with plastics injection molding machines to close a mold and then to lock it in the closed position during the process.

Such a device is known including a locking piston within a cylinder, an actuating piston within a cylinder in the rear surface of the locking piston, a pressure multiplier, the high pressure side of which is connected to the space behind the locking piston, and a passage connected to an oil reservoir communicating with the space behind the locking piston. The locking piston moves rapidly to the desired position, drawing oil in behind it from the oil reservoir, and the passage connected to the oil reservoir is then interrupted to permit the pressure multiplier to increase the pressure behind the locking piston to lock it in position.

In this known device, the passage is provided with a valve, which valve must be opened when oil flows from the oil reservoir and is then closed to interrupt the connection between the reservoir and the space behind the locking piston. The construction of this valve is relatively complex, and its presence also necessitates the provision of means to control it.

It is an object of the present invention to simplify the control of the supply of oil to and from the oil reservoir.

In accordance with the present invention a hydraulic actuating and locking device includes a locking piston within a cylinder, an actuating piston within a cylinder in the rear surface of the locking piston, a pressure multiplier, the high pressure side of which is connected to the space behind the locking piston, and a passage adapted for connection to an oil reservoir communicating with the space behind the locking piston, the passage being adapted to receive and to be sealed by the high pressure piston of the pressure multiplier. The high pressure piston of the pressure multiplier therefore also fulfills the function of the valve in the known device, which valve as a separate entity and its associated control means are therefore entirely absent in the construction in accordance with the invention, thus producing a considerable simplification of design and financial economy.

In the preferred embodiment the device includes an oil reservoir within which the pressure multiplier is situated, and the pressure multiplier is preferably connected directly to the locking piston cylinder. This results in a compact construction and a particularly simple supply of the hydraulic oil to the passage, which can therefore simply be constructed as a high pressure cylinder. In addition, this enables simpler seals to be used on the pressure multiplier, that it to say a greater leakage of oil can be tolerated since this will flow directly back into the reservoir.

The high pressure piston of the pressure multiplier must repeatedly enter and be completely withdrawn from the high pressure cylinder, and this imposes stringent requirements on the seal between the piston and the passage. Thus, in accordance with a further preferred feature of the invention the high pressure piston of the pressure multiplier has in its peripheral surface a groove within which is a sealing arrangement comprising an annular sealing ring radially within which is a resilient annular ring, which latter ring is adapted to be deformed when the high pressure oil enters the groove. During the entry of the sealing arrangement into the high pressure cylinder the radial contact pressure progressively increases in the resilient ring behind the sealing ring. This ensures minimal wear of the seal while at the same time achieving very good sealing characteristics.

In order to facilitate the entry of the sealing arrangement into the high pressure cylinder the sealing ring may be of substantially rectangular cross-section with its leading edge being bevelled.

In order to ensure that guiding of the high pressure piston within the high pressure cylinder is performed by the seal, the front end of the high pressure piston is preferably frusto-conical, converging from the front edge of the groove towards its front end. The front end of the high pressure piston may be constituted by a ring or disc shaped cap whose front end is frusto-conical.

In addition, the entry portion of the high pressure cylinder may be outwardly flared to provide a lead-in for the piston. This reduces seal wear and facilitates a smooth increase in the locking pressure and sealing ring contact pressure.

The invention may be put into practice in many ways, but one specific embodiment of an actuating and locking device for use in conjunction with a plastics injection molding machine will now be described by way of example with reference to the accompanying drawings in which.

Figure 1:
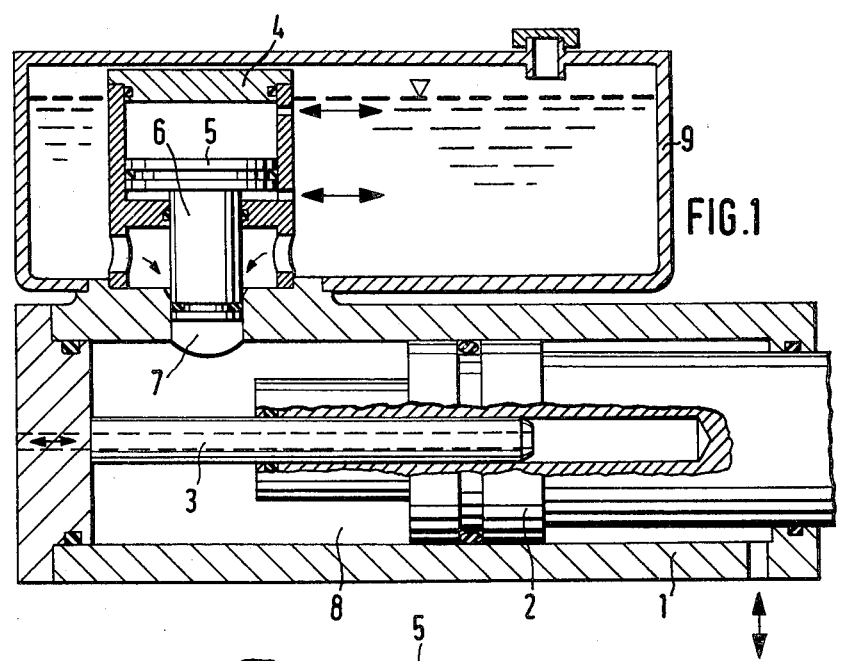
FIG. 1 is a diagrammatic side elevation of the device.

The device comprises a cylindrical housing 1 within which is a locking piston 2. In its rear surface the locking piston has a cylinder slidably received within which is an actuating piston 3 which is secured to the end wall of the housing. The piston 3 has a longitudinal bore extending along its length through which high pressure oil may be introduced into the cylinder within the locking piston 2.

The device further includes a pressure multiplier 4 secured to the side wall of the cylindrical housing 1 and comprising a low pressure piston 5 and a high pressure piston 6. The pressure multiplier is positioned such that the high pressure piston can enter and seal a passage 7 constructed as a high pressure cylinder in the side wall of the cylindrical housing 1. The passage 7 connects the space 8 behind the locking piston 2 to an oil reservoir 9. The oil reservoir surrounds the pressure multiplier 4 and is also connected directly to the cylindrical housing 1.

Figure 2:
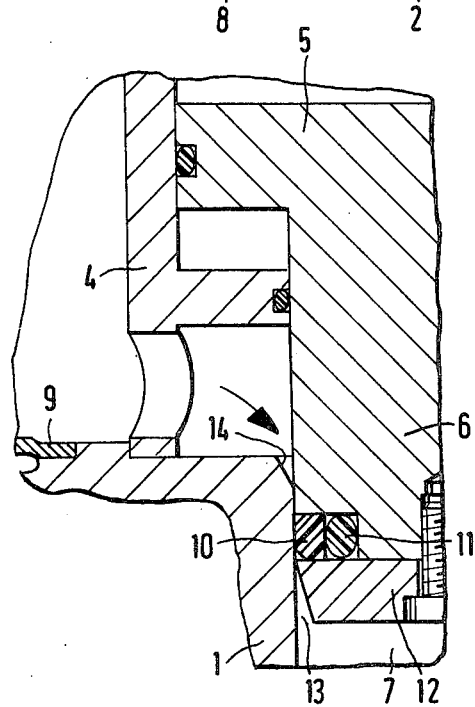
FIG. 2 is a detailed view of part of FIG. 1 on an enlarged scale.

FIG. 2 shows the high pressure piston 6 within the cylinder 7. The piston 6 has a peripheral groove in the forward end of its peripheral surface in which a seal is located, which seal comprises a sealing ring 11 within which is a resilient annular ring 10. The front edge of the sealing ring 10, that is to say the edge which first enters the cylinder 7, is bevelled to reduce wear. Below the groove within which the rings 10 and 11 are accommodated the piston 6 has a disc-shaped cap 12 whose lower or front edge is frusto-conical at 13 to reduce wear and to facilitate entry of the piston 6 into the cylinder 7. For the same reason the entry portion of the cylinder 7 is outwardly flared at 14, to provide a lead-in.

In use, high pressure oil is admitted through the bore within the piston 3, thus moving the locking piston 2 to the right, as seen in FIG. 1, and closing the mold of a plastics injection molding machine. While this occurs oil is drawn from the reservoir 9, through the passage 7, to maintain the space 8 behind the piston 2 full of oil. When the mould is closed, high pressure is then applied to the low pressure piston 5 of the pressure multiplier 10 thus moving the high pressure piston 6 into its cylinder 7 and isolating the space 8 from the oil reservoir 9. It will be appreciated that the piston 6 exerts a pressure on the oil in the space 8 equal to the pressure acting on the low pressure piston 5 multiplied by the ratio of the areas of the larger piston 5 and the smaller piston 6. This multiplied pressure acts over the entire cross-sectional area of the piston 2 (less the area of the piston 3).

Thus the device rapidly moves the piston 2 to its desired position, and then locks it in that position by the application of a considerably larger force than that used to close it.

What I claim as my invention and desire to secure by Letters Patent is:

1. An hydraulic actuating and locking device including a locking piston, a first cylinder, said locking piston mounted within said first cylinder for movement along the axis of the same between a first and a locking position, said locking piston having a rear surface, a space behind said locking piston within the confines of said first cylinder, a second cylinder formed in said rear surface of said locking piston, an actuating piston mounted to said first cylinder sealingly received into said second cylinder, an oil reservoir, a passage through the wall of said first cylinder disposed at an angle relative to said axis communicating the oil in said oil reservoir to said space, a pressure multiplier disposed in said oil reservoir including a high pressure piston movable into and out of said passage, means communicating said second cylinder to a source of pressure whereby upon pressurization of said second cylinder said locking piston moves relative to said actuating piston to said locking position and during movement oil is sucked into said space behind said locking piston, and said high pressure piston of said pressure multiplier upon movement into said passage sealing said passage and pressurizing said space to lock said locking piston in said locking position.

2. The device as claimed in claim 1 wherein said high pressure piston has a peripheral surface, a groove being formed in said peripheral surface, said groove receiving a sealing arrangement, said sealing arrangement comprising an annular sealing ring and a resilient annular ring located within said annular sealing ring adapted to be deformed by said sealing ring when said sealing ring is subjected to pressure.

3. The device as claimed in claim 2 wherein said sealing ring has a leading peripheral edge and is of substantially rectangular cross-section, said leading edge being bevelled.

4. The device as claimed in claim 1 in which said high pressure piston has a front end, said front end being frusto-conical converging from the front edge of the groove towards said front end.

5. The device as claimed in claim 4 wherein said front end of said high pressure piston is constituted by a cap having a front end, said front end of said cap being frusto-conical.

6. The device as claimed in claim 1 wherein said passage has an entry portion, said entry portion being outwardly flared to provide a lead-in for said high pressure piston.

* * * * *